United States Patent
West et al.

(10) Patent No.: US 6,901,414 B2
(45) Date of Patent: May 31, 2005

(54) METHOD AND SYSTEM OF STORING A MAIN DATA FILE AND DELTAS IN A STORAGE DEVICE FOR DETERMINING NEW DATA FILES FROM THE MAIN DATA FILE AND THE DELTAS

(75) Inventors: Christopher J. West, Boulder, CO (US); David A. Serls, Littleton, CO (US)

(73) Assignee: Storage Technology Corporation, Louisville, CO (US)

( * ) Notice: Subject to any disclaimer, the term of this patent is extended or adjusted under 35 U.S.C. 154(b) by 952 days.

(21) Appl. No.: 09/726,868

(22) Filed: Nov. 30, 2000

(65) Prior Publication Data

US 2002/0065799 A1 May 30, 2002

(51) Int. Cl.[7] ................................. B06F 17/30
(52) U.S. Cl. .......................... 707/201; 707/1
(58) Field of Search ................ 707/200–206, 707/100–104.1, 1, 3, 10; 709/204

(56) References Cited

U.S. PATENT DOCUMENTS

| 4,809,170 A | | 2/1989 | Leblang et al. |
| 5,634,052 A | * | 5/1997 | Morris ........................ 707/1 |
| 6,012,063 A | | 1/2000 | Bodnar |
| 6,018,747 A | * | 1/2000 | Burns et al. ................. 707/203 |

FOREIGN PATENT DOCUMENTS

EP          0 899 662 A1    3/1999

OTHER PUBLICATIONS

Schulz Greg: "SAN and NAS; Complementary Technologies—SAN and NAS provide Storage and Data Sharing" MTI Whitepaper, May 1, 2000, XP002201566, p. 4, line 11–p. 7, line 11.

* cited by examiner

Primary Examiner—Mohammad Ali
(74) Attorney, Agent, or Firm—Brooks Kushman P.C.

(57) ABSTRACT

A storage system and method for storing delta difference data indicative of the differences between new data and old data. A data transferring unit has copies of old data and new data. The data transferring unit compares the new data with the old data to determine delta difference data indicative of the differences between the new data and the old data. A target storage device having a copy of the old data receives the delta difference data from the data transferring unit. The target storage device stores the delta difference data and may then determine the new data by merging the old data with the delta difference data. The target storage device transmits the determined new data to a data receiving unit upon request. The method and system may be used with peer-to-peer remote copy (PPRC) storage system and storage area network (SAN) storage system.

33 Claims, 3 Drawing Sheets

METHOD AND SYSTEM OF STORING A MAIN DATA FILE AND DELTAS IN A STORAGE DEVICE FOR DETERMINING NEW DATA FILES FROM THE MAIN DATA FILE AND THE DELTAS

TECHNICAL FIELD

The present invention relates generally to a method and system for storing in a storage device a main data file and delta difference data indicative of the differences between new data files and the main data file.

BACKGROUND ART

There are a variety of applications in which a data file is transferred from a data transferring unit to a target storage device in order to have the data file copied onto the target storage device. These applications include peer-to-peer remote copy (PPRC) systems, storage area network (SAN) systems, and systems generally having memory or a host connected to a target storage device. In these applications similar data files may be stored on the target storage device. This is a problem because it is not efficient to store multiple copies of similar data files on the target storage device because each data file may need a large amount of storage space even though the differences between the data files may be slight. Delta difference data is indicative of the differences between two data files. That is, a second data file may be determined by merging a first data file with delta difference data indicative of the differences between the first and second data files. Typically, the delta difference data takes up much less storage space than a data file.

SUMMARY OF THE INVENTION

Accordingly, it is an object of the present invention to provide a method and system for storing in a storage device a main data file and delta difference data indicative of the differences between new data files and the main data file.

It is another object of the present invention to provide a method and system for storing in a storage device a main data file and delta difference data indicative of the differences between new data files and the main data file for enabling the storage device to determine the new data files from the main data file and the delta difference data.

It is a further object of the present invention to provide a method and system for a storage device to determine new data files from a main data file and delta difference data indicative of the differences between new data files and the main data file.

It is still another object of the present invention to provide a method and system for transferring delta difference data indicative of the differences between new data files and a main data file to a storage device having a copy of the main data file for the storage device to store the delta difference data and then determine the new data files based on the main data file and the delta difference data.

It is still a further object of the present invention to provide a peer-to-peer remote copy (PPRC) method and system in which a secondary storage subsystem stores a main data file and delta difference data indicative of the differences between new data files and the main data file for enabling the storage subsystem to determine the new data files from the main data file and the delta difference data.

It is still yet another object of the present invention to provide a storage area network (SAN) method and system in which a storage device of the SAN stores a main data file and delta difference data indicative of the differences between new data files and the main data file for enabling the storage device to determine the new data files from the main data file and the delta difference data.

It is still yet a further object of the present invention to provide a method and system for storing in a storage device a snapshot copy of a track, delta difference data indicative of the differences of the snapshot copy of the track and a new track, and meta data pointing from the delta difference data to the snapshot copy of the track for enabling the storage device to determine the new track from the snapshot copy of the track, the delta difference data, and the meta data.

Still, it is yet another object of the present invention to provide a method and system for storing in a storage device a main data file, delta difference data indicative of the differences between new data files and the main data file, and meta data for each delta difference data associated with a new data file at a given point in time for enabling the storage device to determine the new data files at given points in time from the main data file, the delta difference data, and the meta data.

In carrying out the above objects and other objects, the present invention provides a storage system having a target storage device storing old data. The target storage device is operable for receiving delta difference data indicative of the differences between new data and the old data. The target storage device is further operable for storing the delta difference data. The target storage device further has a processor for processing the old data with the delta difference data to determine the new data.

The target storage device may store meta data with the delta difference data associating the delta difference data with the new data. The target storage may store second old data and may be further operable for receiving second delta difference data indicative of the differences between second new data and the second old data. In this event, the target storage device is further operable for storing the second old data and stores second meta data with the second delta difference data associating the second delta difference data with the second old data.

The old data may be an old data track and the new data may be a new data track. The delta difference data would then be indicative of the differences between the new data track and the old data track. The old data may be an old data file and the new data may be a new data file. The delta difference data would then be indicative of the differences between the new data file and the old data file.

The target storage device may be operable for receiving second delta difference data indicative of the differences between second new data and the old data, and then storing the second delta difference data. The processor merges the old data with the second delta difference data to determine the second new data. The target storage device may then store second meta data with the second delta difference data to associate the second delta difference data with the second new data.

The storage system may be a peer-to-peer remote copy (PPRC) storage system with the target storage device being a secondary storage subsystem of the PPRC storage system. The storage system may be a storage area network (SAN) storage system with the target storage device being a storage device of the SAN storage system.

In carrying out the above objects and other objects, the present invention also provides a storage system including a data transferring unit having old data and new data. The data transferring unit includes a processor for comparing the new data with the old data to determine delta difference data indicative of the differences between the new data and the old data. The data transferring unit has a transmitter for transmitting the delta difference data. The storage system further includes a target storage device having the old data. The target storage device has a receiver for receiving the delta difference data from the data transferring unit. The target storage device has storage for storing the delta difference data. The target storage device may include a processor operable with the storage for processing the old data with the delta difference data to determine the new data. The storage system may further include a data receiving unit. The processor of the target storage device transmits determined new data to the data receiving unit upon such a request from the data receiving unit to the target storage device.

Further, in carrying out the above objects and other objects, the present invention provides a method for storing data in a storage system. The method includes storing old data in a target storage device. Delta difference data indicative of the differences between new data and the old data is then received at the target storage device. The delta difference data is then stored in the target storage device. The old data is then merged with the delta difference data at the target storage device to determine the new data.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

In general, the present invention is a method and system for storing in a storage device a main data file and delta difference data indicative of the differences between new data files and the main data file. For each new data file the storage device stores delta difference data indicative of the differences of the new data file and the main data file. The storage device stores the main data file and delta difference data instead of storing similar data files. A new data file typically requires a large amount of storage space while delta difference data associated with a new data file requires a much smaller amount of storage space. Accordingly, the storage device can store much more delta difference data than new data files. The storage device can then generate the new data files based on the main data file and the delta difference data.

In operation, the storage device has a copy of a main data file. When the main data file is updated at a data transferring unit the data transferring unit determines the differences between the updated or new data file and the main data file. Instead of transferring the new data file to the storage device, the data transferring unit transfers the differences (i.e., delta difference data) to the storage device. The delta difference data reflects the changes made to the main data file to produce the new data file, i.e., the differences between the new and main data files. The storage device then stores the delta difference data with meta data that indicates that this delta difference data is associated with the new data file. The storage device can then determine the new data file from the main data file and the delta difference data associated with the new data file. The storage device determines the new data file by modifying or merging the main data file with the delta difference data.

If the main data file is updated again by either the data transferring unit or another data transferring unit, then a second delta difference data indicative of the differences between the second new data file and the main data file is determined. The storage device then stores the second delta difference data with second meta data indicating that the second delta difference data is associated with the second new data file. The storage device can then determine the second new data file from the main data file and the second delta difference data. Because the data size of the deltas are typically much smaller than the size of the new data files the amount of storage space required by the storage device for storing the deltas is much smaller than the amount of storage space required for storing the new data files.

Figure 1:
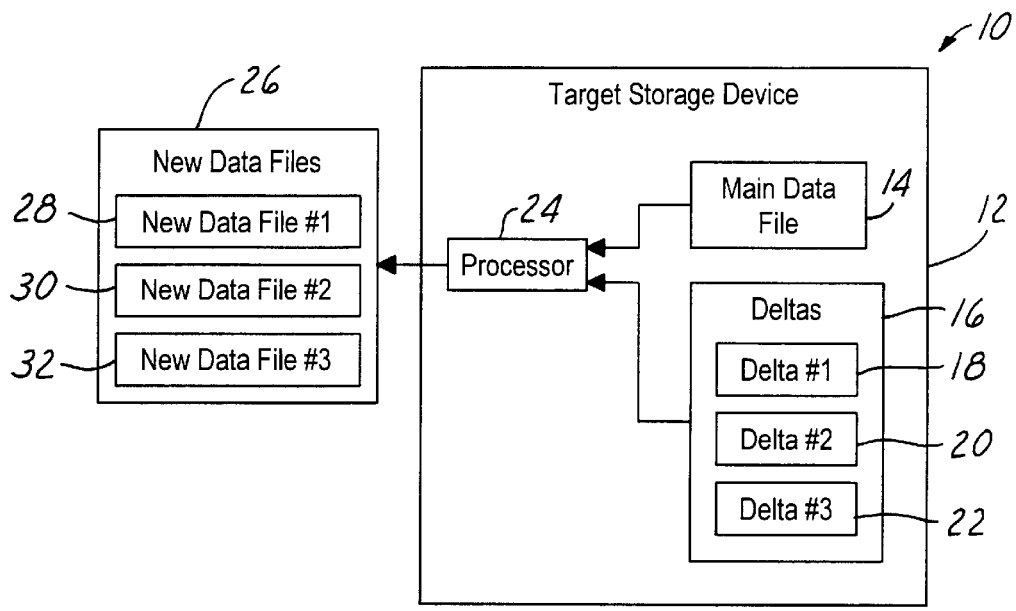
FIG. 1 illustrates a block diagram of a storage system for use with the method and system of the present invention.

Referring now to FIG. 1, a block diagram of a storage system 10 for use with the method and system of the present invention is shown. Storage system 10 includes a target storage device 12 having storage 14 for storing a copy of a main data file and storage 16 for storing a plurality of deltas. Each delta is indicative of the differences between the main data file and an updated or new data file. For example, storage 16 stores a first delta 18 indicative of the differences between the main data file and a first new data file, a second delta 20 indicative of the differences between the main data file and a second new data file, and a third delta 22 indicative of the differences between the main data file and a third new data file.

Storage device 12 further includes a processor 24 for determining a new data file from the main data file and the delta associated with the new data file. Processor 24 includes two input streams: 1) a copy of the main data file from storage 14 and 2) a delta from storage 16. Processor 24 computes the new data file by modifying or merging the main data file with the delta associated with the new data file. Storage device 12 then transmits the computed new data file to an external device 26 in response to the external device requesting a copy of the new data file. For instance, if the delta is first delta 18 then processor 24 computes first new data file 28 from the main data file and the first delta. Similarly, if the delta is second delta 20 then processor 24 computes second new data file 30 from the main data file and the second delta; and if the delta is third delta 22 then the processor computes third new data file 32 from the main data file and the third delta.

Figure 2:
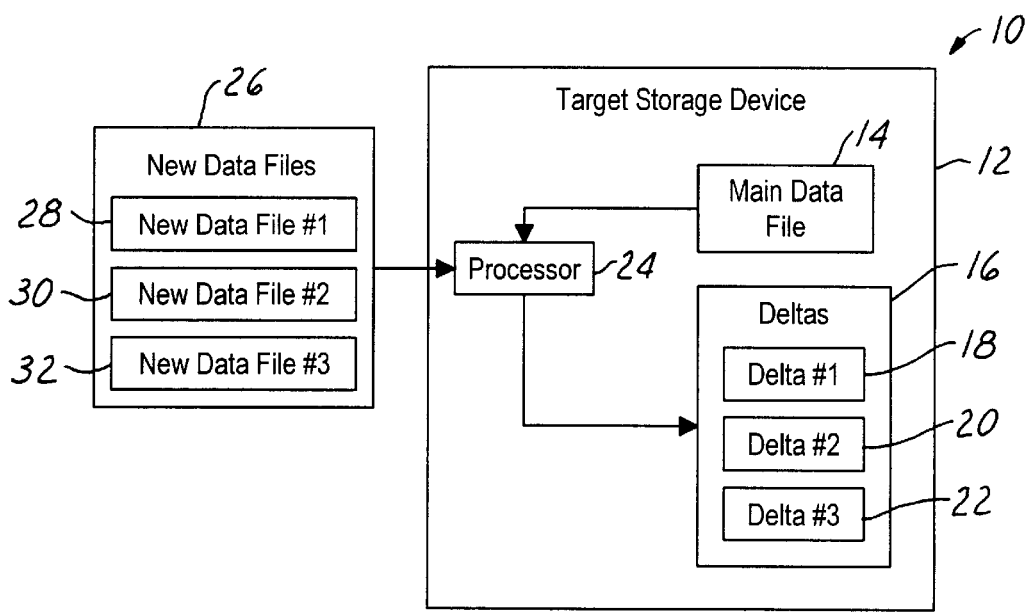
FIG. 2 illustrates a block diagram of the storage system shown in FIG. 1.

Referring now to FIG. 2, another use of storage system 10 in accordance with the method and system of the present invention will now be described. As described with reference to FIG. 1, storage system 10 computes new data files from a main data file and deltas associated with the new data files. Storage system 10 as shown in FIG. 2 may also internally compute and store deltas associated with new data files from a main data file and the new data files.

To perform this function, processor 24 determines a delta from the main data file and a new data file. Processor 24 includes two input streams: 1) a copy of the main data file from storage 14 and 2) a copy of a new data file from an external device 26. Processor 24 computes the delta associated with the new data file by comparing the new data file with the main data file. The delta is indicative of the differences between the new data file and the main data file. Processor 24 then transmits the delta associated with the new data file to storage 16. For example, if the new data file is first new data file 28 then processor 24 computes first delta 18 from the main data file and the first new data file. Similarly, if the new data file is second new data file 30 then processor 24 computes second delta 20 from the main data file and the second new data file; and if the new data file is third new data file 32 then the processor computes third delta 22 from the main data file and the third new data file.

Figure 3:
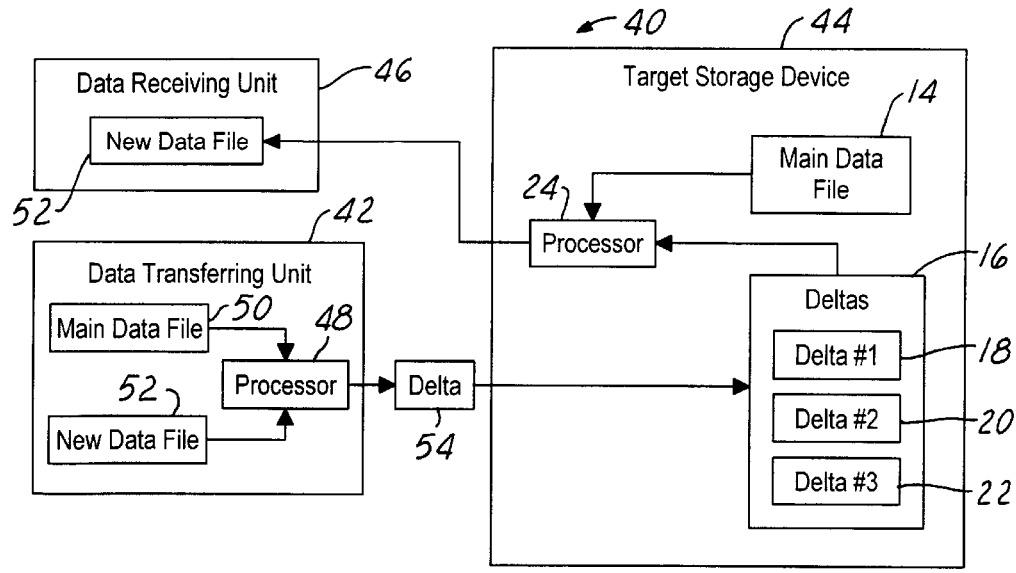
FIG. 3 illustrates a block diagram of an alternative embodiment of the storage system for use with the method and system of the present invention.

Referring now to FIG. 3, a block diagram of an alternative embodiment of a storage system 40 for use with method and system of the present invention is shown. Storage system 40 generally includes a data transferring unit 42, a target storage device 44, and a data receiving unit 46. In general, data transferring unit 42 determines a delta between a main data file and a new data file and then transmits the delta to target storage device 44. Target storage device 44 stores the delta associated with the new data file and has a previously stored copy of the main data file. Upon request from data receiving unit 46 for a copy of the new data file, target storage device 44 determines the new data file from the main data file and the delta associated with the new data file. Target storage device 44 then transmits the new data file to data receiving unit 46.

To this end, data transferring unit 42 includes a processor 48, a copy of the main data file 50, and a copy of a new data file 52. Processor 48 compares the copy of the main data file 50 with the copy of the new data file 52 to determine a delta 54 indicative of the differences between the new and main data files. Data transferring unit 42 then transfers delta 54 to target storage device 44. Target storage device 44 then stores delta 54 in storage 16 along with meta data indicative of the new data file the delta is associated. For instance, if the new data file is the first new data file then storage 16 associates meta data with delta 54 indicating that delta 54 is first delta 18. Similarly, if the new data file is the second new data file then storage 16 associates meta data with delta 54 indicating that delta 54 is second delta 20.

Upon data receiving unit 46 requesting target storage device 44 to provide a copy of the new data file, processor 24 of the target storage device determines the new data file from the main data file in storage 14 and delta 54 in storage 16. The main data file in storage 14 is identical to the main data file 50 in data transferring unit 42. Processor 24 merges the main data file with the delta to determine the new data file. Target storage device 44 then transfers a copy of the new data file 52 to data receiving unit 46. For example, if data receiving unit 46 is requesting a copy of the first new data file then processor 24 of target storage device 44 merges the main data file with first delta 18 to determine the first new data file. Similarly, if data receiving unit 46 is requesting a copy of the second new data file then processor 24 merges the main data file with second delta 20 to determine the second new data file.

Figure 4:
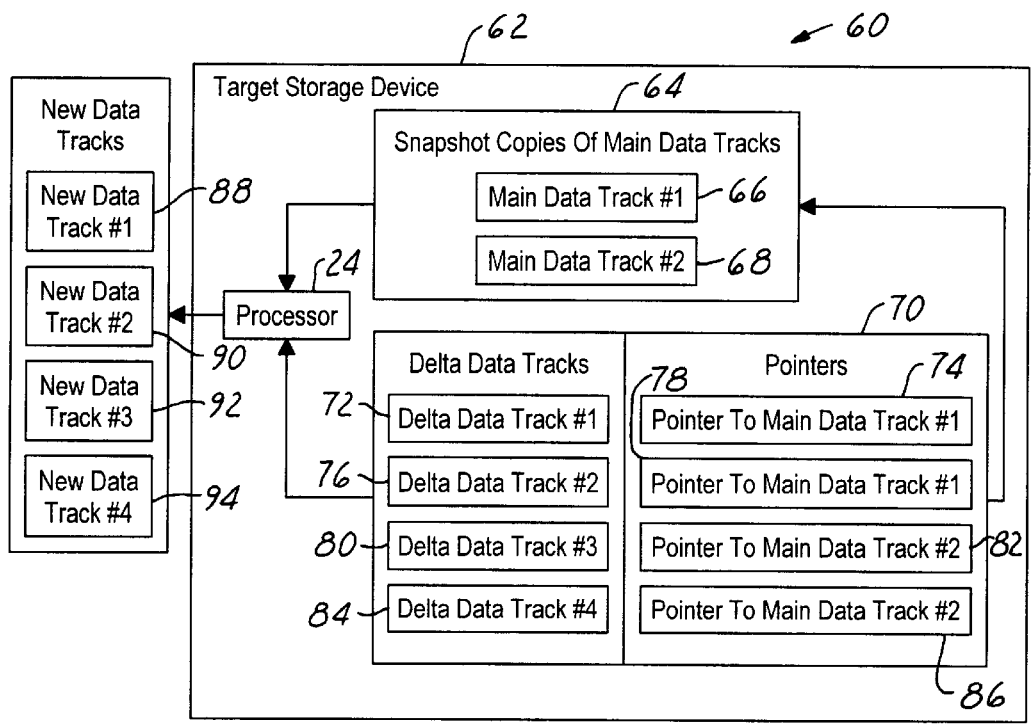
FIG. 4 illustrates a block diagram of a second alternative embodiment of the storage system for use with the method and system of the present invention.

Referring now to FIG. 4, a block diagram of a second alternative embodiment of a storage system 60 for use with the method and system of the present invention is shown. Storage system 60 includes a target storage device 62 having storage 64 for storing a plurality of snapshot copies of main data tracks. A data track includes one or more units of data. For example, storage 64 stores a snapshot copy of a first main data track 66 and a snapshot copy of a second main data track 68. Storage device 62 further includes a storage 70 for storing a plurality of delta data tracks and pointers associated with each delta data track. Each delta data track is indicative of the differences between a main data track and a new data track. Each pointer associated with a delta data track is meta data that indicates which main data track the delta data track is associated.

For example, storage 70 stores a first delta data track 72 and a first pointer 74. First pointer 74 points to the first main data track 66 thereby indicating that the first delta data track 72 is indicative of the differences between the first main data track 66 and a first new data track 88. Storage 70 also stores a second delta data track 76 and a second pointer 78. Second pointer 78 points to the first main data track 66 thereby indicating that the second delta data track 76 is indicative of the differences between the first main data track 66 and a second new data track 90. Similarly, storage 70 stores a third delta data track 80 and a third pointer 82. Third pointer 82 points to the second main data track 68 thereby indicating that third delta data track 80 is indicative of the differences between the second main data track 68 and a third new data track 92. Storage 70 also stores a fourth delta data track 84 and a fourth pointer 86. Fourth pointer 86 points to the second main data track 68 thereby indicating that the fourth delta data track 84 is indicative of the differences between the second main data track 68 and a fourth new data track 94.

In operation, a snapshot copy of a main data track from an external host is stored in storage 64 of target storage device 62. When the host updates the main data track to produce a new data track the host (or target storage device 62) determines the delta indicative of the differences between the main data track and the new data track. Target storage device 62 then just stores the delta, i.e., the delta data track, in storage 72 with a pointer pointing from the delta data track to the main data track. This avoids saving the entire new data track in target storage device 62. When the host reads the new data track from target storage device 62, processor 24 of the target storage device reads the main data track and the delta data track to generate the new data track. Target storage device 62 then transfers the new data track to the host.

As the host writes more delta data tracks, the delta data tracks are just appended in storage 70 to the other delta data tracks until the storage used for accommodating the delta data tracks approaches that used for storing the main data track. At that time, the delta data tracks would be applied by processor 24 to the main data track and then the entire updated main data track would be saved in storage 64 and the references (i.e., pointers) to the original main data track would no longer be maintained.

In general, target storage device 62 would also lend itself to generating a point in time copy of data and then storing deltas from that point forward. This would allow the host to revert back to a prior copy of the data by discarding deltas. Generation of the point in time copy would be signaled by the host to target storage device 62. This point in time data is accessible with some extended protocol. The point in time copy of the data is maintained through pointers in a similar manner to the snapshot data copies described above. A special revert command could bring the data back through pointer manipulation on target storage device 62.

Figure 5:
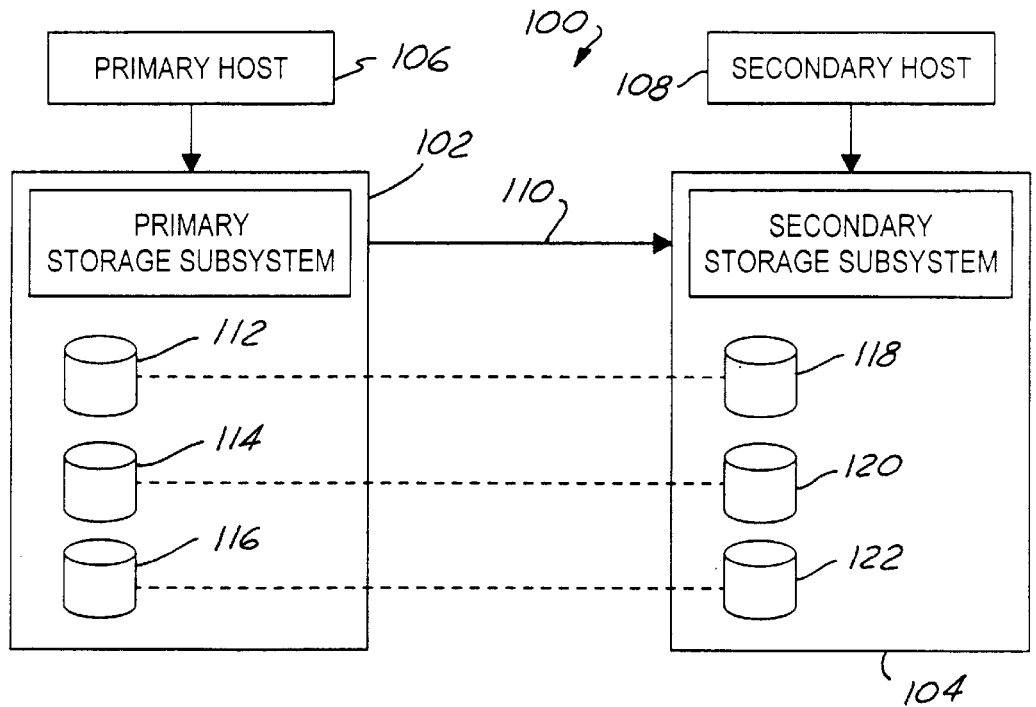
FIG. 5 illustrates an embodiment of the method and system of the present invention for use with a peer-to-peer remote copy (PPRC) storage.

Referring now to FIG. 5, an embodiment of the method and system of the present invention for use with a peer-to-peer remote copy (PPRC) storage system 100 is shown. PPRC system 100 includes a primary storage subsystem 102 and a secondary storage subsystem 104. PPRC system 100 further includes a primary host 106 connected to primary storage 102 and a secondary host 108 connected to secondary storage 104. Primary host 106 stores data in primary storage 102. In general, data written to primary storage 102 is copied to secondary storage 104. The copy process creates a copy of the data from primary storage 102 into secondary storage 104. In PPRC system 100, a write made by primary host 106 is considered complete only after the data written to primary storage 102 is also written to secondary storage 104. Primary and secondary storage 102 and 104 may include various storage devices such as disks, tape, optical media, and the like.

A communication path 110 connects primary storage 102 with secondary storage 104. Primary storage 102 includes a set of storage volumes 112, 114, and 116. Secondary storage 104 includes a set of storage volumes 118, 120, and 122. Secondary storage volumes 112, 114, 116 correspond to primary storage volumes 118, 120, and 122. The correspondence between the volumes in primary and secondary storage 102 and 104 is set up in PPRC pairs such that a storage volume in primary storage 102 has a corresponding storage volume in secondary storage 104. For instance, primary volume 112 is paired with secondary volume 118, primary volume 114 is paired with secondary volume 120, and primary volume 114 is paired with secondary volume 122. These pairs are referred to as established PPRC pairs.

In accordance with the method and system of the present invention, primary storage 102 sends a delta indicative of the differences between a new data file and on old data file over communication path 110 to secondary storage 104 each time new data is written to a primary storage volume by primary host 116. In contrast to prior art PPRC systems which transfer the entire new data file from primary storage to secondary storage, PPRC system 100 only transfers the delta indicative of the differences between the new data file and the old data file from primary storage 102 to secondary storage 104. Secondary storage 104 stores the delta received from primary storage 102 with meta data indicating the new data file the delta is associated.

In operation, prior to the old data file being updated at primary storage 102, the primary storage and secondary storage 104 both have a copy of the old data file. After primary storage 102 updates the old data file and transfers the delta to secondary storage 104, the secondary storage stores the delta in the secondary storage volume corresponding to the primary storage volume. Secondary storage 104 may then determine the new data file from the copy of the old data file and the delta stored in the secondary storage volume. For example, if the new data file is written to primary storage volume 112 then the determined delta is copied to the corresponding secondary storage volume 118 with meta data indicating that the delta is associated with the new data file. Similarly, if the new data file is written to primary storage volume 114 then the determined delta is copied to the corresponding secondary storage volume 120 with meta data indicating that the delta is associated with the new data file.

Figure 6:
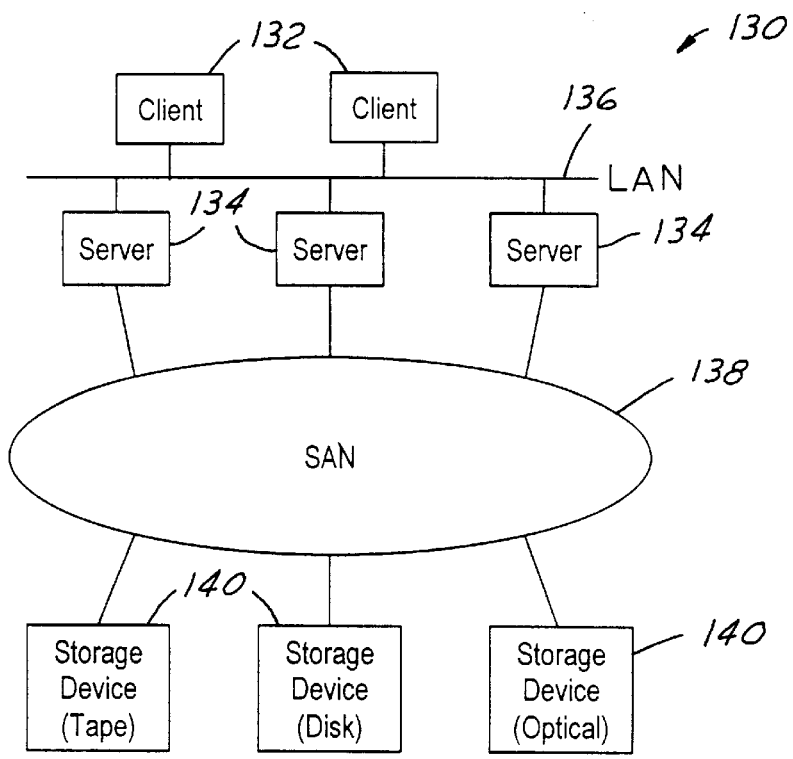
FIG. 6 illustrates an embodiment of the method and system of the present invention for use with a storage area network (SAN) storage system.

Referring now to FIG. 6, an embodiment of the method and system of the present invention for use with a storage area network (SAN) storage system 130 is shown. SAN storage system 130 includes a plurality of clients or host computers 132 and a plurality of servers 134 each connected to a local area network (LAN) 136. A storage area network (SAN) 138 connects servers 134 to a plurality of storage devices 140. In typical SAN storage systems, the clients write data files to servers and the servers transport the data files over the SAN for storage in one of the storage devices.

In accordance with the method and system of the present invention, both a server 134 and a storage device 140 of SAN storage system 130 have a copy of an old data file. Client 132 modifies the old data file with changes such that the old data file is now an updated data file. Server 134 sends a delta indicative of the differences between the updated data file and the old data file over SAN 138 to storage device 140 each time new data is written by client 132. Storage device 140 then stores the delta with a copy of the old data file. The new data file can then be determined from the delta and the copy of the old data file stored in storage device 140. In contrast to prior art SAN storage systems which store the entire new data file from server 134 to storage device 140 via SAN 138, SAN storage system 130 only transfers the delta indicative of the differences between the new data file and the old data file from the server to the storage device via the SAN. Storage device 140 then just stores only the delta and not the entire new data file.

In operation, server 134 loads a copy of the old data file from storage device 140 upon a request by client 132 to modify the old data file. As a result, prior to the old data file being updated by client 132 at server 134, the server and storage device 140 both have a copy of the old data file. After server 84 updates the data and transfers the delta to storage device 140, the storage device stores the delta and then may determine the new data file from the old data file and the delta.

The present invention has been described as a method and system of storing in a target storage device a main data file and delta difference data indicative of the differences between new data files and the main data file. Of course, the method and system of the present invention may function in reverse. That is, the target storage device may store a new data file (or main data file) and delta difference data indicative of the differences between old data files and the new data file. For each old data file the target storage device stores delta difference data indicative of the differences between the old data file and the new data file. In operation, the target storage device determines a new data file from a stored old data file and delta difference data indicative of the differences between the new data file and the old data file. The target storage device then stores the new data file in place of the stored old data file. The target storage device may then store "negative" delta difference data indicative of the differences between the old data file and the new data file. Subsequently, the target storage device may determine the old data file from the new data file and the negative delta difference data. In effect, the target storage device uses the negative delta difference data to remove the differences from the new data file to determine the old data file.

Thus it is apparent that there has been provided, in accordance with the present invention, a method and system for storing in a storage device a main data file and delta difference data indicative of the differences between new or old data files and the main data file that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage system comprising:

a target storage device storing old data, the target storage device operable for receiving first delta difference data indicative of the differences between first new data and the old data and for receiving second delta difference data indicative of the differences between second new data and the old data, the target storage device further operable for storing the first and second delta difference data at the same point in time, the target storage device further having a processor for processing the old data with the first delta difference data to determine the first new data and for processing the old data with the second delta difference data to determine the second new data.

2. The storage system of claim 1 wherein:

the target storage device stores first meta data with the first delta difference data associating the first delta difference data with the first new data.

3. The storage system of claim 1 wherein:

the target storage device stores second old data and is further operable for receiving third delta difference data indicative of the differences between third new data and the second old data, the target storage device further operable for storing the second old data, wherein the target storage device stores second meta data with the third delta difference data associating the third delta difference data with the second old data.

4. The storage system of claim 1 wherein:

the processor is operable to determine and transfer at least one of the first and second new data to a data receiving unit upon request.

5. The storage system of claim 1 wherein:

the processor compares the old data with at least one of the first and second new data to determine at least one of the first and second delta difference data.

6. The storage system of claim 1 further comprising:

a data transferring unit having the old data and the first and second new data, the data transferring unit operable for comparing the first and second new data with the old data to determine the first and second delta difference data, the data transferring unit operable for transmitting the first and second delta difference data to the target storage device.

7. The storage system of claim 1 wherein:

the old data is an old data track, the first new data is a first new data track, and the first delta difference data is indicative of the differences between the first new data track and the old data track.

8. The storage system of claim 1 wherein:

the old data is an old data file, the first new data is a first new data file, and the first delta difference data is indicative of the differences between the first new data file and the old data file.

9. The storage system of claim 1 wherein:

the target storage device stores second meta data with the second delta difference data to associate the second delta difference data with the second new data.

10. The storage system of claim 1 wherein:

the storage system is a peer-to-peer remote copy (PPRC) storage system, wherein the target storage device is a secondary storage subsystem of the PPRC storage system.

11. The storage system of claim 1 wherein:

the storage system is a storage area network (SAN) storage system, wherein the target storage device is a storage device of the SAN storage system.

12. A storage system comprising:

a data transferring unit having old data, first new data, and second new data, the data transferring unit including a processor for comparing the first new data with the old data to determine first delta difference data indicative of the differences between the first new data and the old data and for comparing the second new data with the old data to determine second delta difference data indicative of the differences between the second new data and the old data, the data transferring unit having a transmitter for transmitting the first and second delta difference data; and a target storage device having the old data, the target storage device having a receiver for receiving the first and second delta difference data from the data transferring unit, the target storage device having storage for simultaneously storing the first and second delta difference data.

13. The storage system of claim 12 wherein:

the target storage device includes a processor operable with the storage for processing the old data with the first delta difference data to determine the first new data.

14. The storage system of claim 13 further comprising:

a data receiving unit, wherein the processor of the target storage device transmits determined first new data to the data receiving unit upon such a request from the data receiving unit to the target storage device.

15. The storage system of claim 12 wherein:

the storage system is a peer-to-peer remote copy (PPRC) storage system, wherein the data transferring unit is a primary storage subsystem of the PPRC storage system and the target storage device is a secondary storage subsystem of the PPRC storage system.

16. The storage system of claim 12 wherein:

the storage system is a storage area network (SAN) storage system, wherein the target storage device is a storage device of the SAN storage system.

17. A method for storing data in a storage system, the method comprising:

storing old data in a target storage device;

receiving first delta difference data indicative of the differences between first new data and the old data at the target storage device;

receiving second delta difference data indicative of the differences between second new data and the old data at the target storage device;

storing simultaneously the first and second delta difference data in the target storage device;

processing the old data with the first delta difference data at the target storage device to determine the first new data; and processing the old data with the second delta difference data at the target storage device to determine the second new data.

18. The method of claim 17 further comprising:

storing first meta data with the first delta difference data associating the first delta difference data with the first new data.

19. The method of claim 17 further comprising:

storing second old data in the target storage device;

receiving third delta difference data indicative of the differences between third new data and the second old data at the target storage device; and storing in the target storage device second meta data with the third delta difference data, the second meta data associating the third delta difference data with the second old data.

20. The method of claim 17 further comprising:

transferring the first new data from the target storage device to a data receiving unit.

21. The method of 17 further comprising:

comparing the old data with the first and second new data at the target storage device to determine the first and second delta difference data.

22. The method of claim 17 wherein:

the old data is an old data track, the first new data is a first new data track, and the first delta difference data is indicative of the differences between the first new data track and the old data track.

23. The method of claim 17 wherein:

the old data is an old data file, the first new data is a first new data file, and the first delta difference data is indicative of the differences between the first new data file and the old data file.

24. The method of claim 17 further comprising:

storing second meta data with the second delta difference data at the target storage device, the second meta data associating the second delta difference data with the second new data.

25. The method of claim 17 wherein:

the storage system is a peer-to-peer remote copy (PPRC) storage system, wherein the target storage device is a secondary storage subsystem of the PPRC storage system.

26. The method of claim 17 wherein:

the storage system is a storage area network (SAN) storage system, wherein the target storage device is a storage device of the SAN storage system.

27. A storage system comprising:

a target storage device storing new data, the target storage device operable for receiving first delta difference data indicative of the differences between first old data and the new data and for receiving second delta difference data indicative of the differences between second old data and the new data, the target storage device further operable for storing the first and second delta difference data at the same point in time, the target storage device further having a processor for processing the new data with the first delta difference data to determine the first old data and for processing the new data with the second delta difference data to determine the second old data.

28. The storage system of claim 27 wherein:

the storage system is a peer-to-peer remote copy (PPRC) storage system, wherein the target storage device is a secondary storage subsystem of the PPRC storage system.

29. The storage system of claim 27 wherein:

the storage system is a storage area network (SAN) storage system, wherein the target storage device is a storage device of the SAN storage system.

30. A storage system comprising:

a data transferring unit having new data, first old data, and second old data, the data transferring unit including a processor for comparing the first old data with the new data to determine first delta difference data indicative of the differences between the first old data and the new data and for comparing the second old data with the new data to determine second delta difference data indicative of the differences between the second old data and the new data, the data transferring unit having a transmitter for transmitting the first and second delta difference data; and a target storage device having the new data, the target storage device having a receiver for receiving the first and second delta difference data from the data transferring unit, the target storage device having storage for storing the first and second delta difference data at the same point in time.

31. The storage system of claim 30 wherein:

the target storage device includes a processor operable with the storage for processing the new data with the first delta difference data to determine the first old data.

32. The storage system of claim 31 further comprising:

a data receiving unit, wherein the processor of the target storage device transmits determined first old data to the data receiving unit upon such a request from the data receiving unit to the target storage device.

33. A method for storing data in a storage system, the method comprising:

storing new data in a target storage device;

receiving first delta difference data indicative of the differences between first old data and the new data at the target storage device;

receiving second delta difference data indicative of the differences between second old data and the new data at the target storage device;

storing the first and second delta difference data at the same time in the target storage device;

processing the new data with the first delta difference data at the target storage device to determine the first old data; and processing the new data with the second delta difference data at the target storage device to determine the second old data.

* * * * *